United States Patent
Martinez

(10) Patent No.: US 10,187,040 B2
(45) Date of Patent: Jan. 22, 2019

(54) CONFIGURABLE DELAY LINE

(71) Applicant: STMicroelectronics (Rousset) SAS, Rousset (FR)

(72) Inventor: Albert Martinez, Bouc Bel Air (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 15/700,475

(22) Filed: Sep. 11, 2017

(65) Prior Publication Data

US 2018/0269855 A1    Sep. 20, 2018

(30) Foreign Application Priority Data

Mar. 14, 2017  (FR) ...................................... 17 52066

(51) Int. Cl.
H03H 11/26 (2006.01)
H03L 7/06 (2006.01)

(52) U.S. Cl.
CPC ................................ H03H 11/265 (2013.01)

(58) Field of Classification Search
CPC .................................................. H03H 11/265
See application file for complete search history.

(56) References Cited

U.S. PATENT DOCUMENTS

| 5,768,295 A * | 6/1998 | Yamamoto | H03M 13/00 714/746 |
| 6,687,319 B1 * | 2/2004 | Perino | H04B 1/707 375/130 |
| 8,169,851 B2 * | 5/2012 | Chou | G11C 7/222 365/233.11 |
| 2016/0004510 A1 | 1/2016 | Haddad et al. | |

FOREIGN PATENT DOCUMENTS

WO    WO-02052782 A1    7/2002

OTHER PUBLICATIONS

INPI Search Report and Written Opinion for FR 1752066 dated Dec. 5, 2017 (8 pages).

* cited by examiner

*Primary Examiner* — Kenneth B Wells
(74) *Attorney, Agent, or Firm* — Crowe & Dunlevy

(57) ABSTRACT

A delaying element includes a first XOR logic gate and a second XOR logic gate. A first input of the first XOR logic gate defines an input terminal. A first input of the second XOR logic gate is connected to an output of the first XOR logic gate. An output of the second XOR logic gate defines an output terminal. The second inputs of the first and second XOR logic gates are connected to a second input terminal.

21 Claims, 4 Drawing Sheets

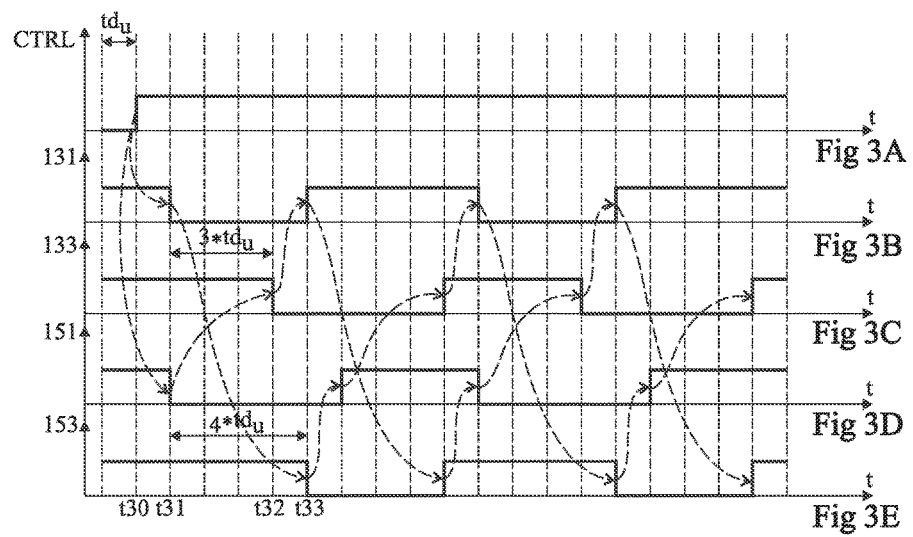
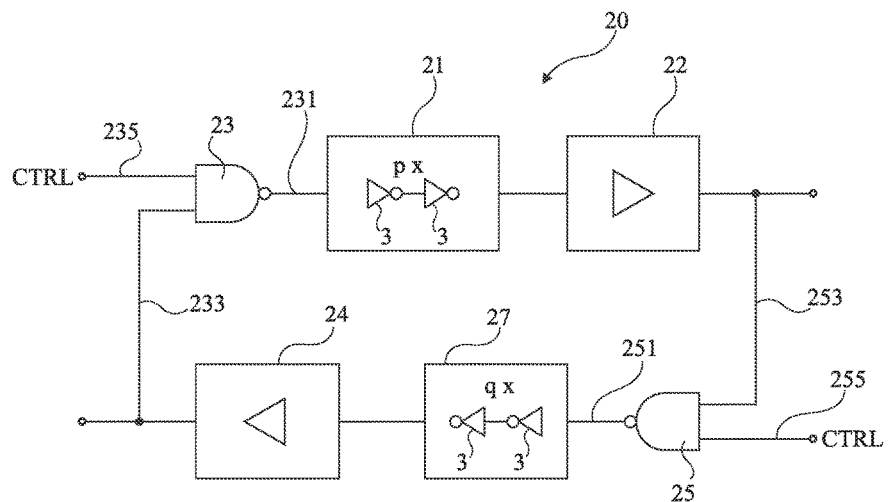
Fig 4

CONFIGURABLE DELAY LINE

PRIORITY CLAIM

This application claims the priority benefit of French Application for Patent No. 1752066, filed on Mar. 14, 2017, the disclosure of which is hereby incorporated by reference in its entirety to the maximum extent allowable by law.

TECHNICAL FIELD

The present description generally relates to electronic circuits and, more particularly, to electronic functions or circuits usable such as in an electronic device or circuit. An example of an application of the electronic functions and circuits of the present description is production of a random-number generator. Another example of an application is production of a physically unclonable function (PUF), for example for generating unique identifiers or unique cryptographic keys. The present description more particularly relates to the production of delaying elements or cells of a delay line.

BACKGROUND

In many applications, processing units, for example the central processing units (CPUs) of microcontrollers, use delay lines.

Many circuits use delay lines. It may, for example, be a question of a circuit for generating random numbers based on the use of delay lines looped back on one another.

There is a need to improve delay lines, for example for random-number generators, circuits delivering physically unclonable functions, and more generally in other applications where similar problems arise.

SUMMARY

One embodiment mitigates all or some of the drawbacks of conventional delay-line solutions.

One embodiment proposes a solution that is particularly suitable for the generation of random numbers or physical functions for unique identifiers, cryptographic keys, etc.

One embodiment of the present description proposes a delaying element for a delay line.

One embodiment proposes a delaying element for a delay line usable in a circuit the behavior of which may be modeled to produce a generator of numbers of oscillations for the purpose of generating random numbers or an unclonable number.

Thus, one embodiment provides a delaying element, including: a first XOR logic gate, a first input of which defines an input terminal of the element; a second XOR logic gate a first input of which is connected to the output of the first gate and an output of which defines an output terminal of the element, second inputs of the two gates being connected to a second input terminal of the element.

According to one embodiment, whether the delaying element applies symmetric delays to rising fronts and to falling fronts or applies different delays to rising fronts and to falling fronts is dependent on the state of the signal applied to the second terminal.

One embodiment provides a delay line including at least one delaying element.

One embodiment provides a set of delay lines in series, including at least one delay line.

According to one embodiment, the set includes a plurality of delay lines, at least one of which applies symmetric delays to rising fronts and to falling fronts and at least one of which applies different delays to rising fronts and to falling fronts.

According to one embodiment, the set includes at least one multiplexer inserted between two delay lines, a first input of the multiplexer being connected to the output of a first delay line and a second input of the multiplexer being connected to the input of this first delay line.

One embodiment also provides a circuit for generating a number of oscillations including: a first branch comprising at least one set of delay lines such as above; and a second branch, looped back on the first and comprising at least one delay line applying symmetric delays to rising fronts and to falling fronts.

According to one embodiment, the second branch also includes at least one set of delay lines such as above.

One embodiment also provides a number generator including: at least one circuit for generating a number of oscillations; and at least one counter for counting the number of oscillations generated by said circuit.

One embodiment also provides an electronic device including at least one number generator, said circuit being configured to generate a random number of oscillations.

According to one embodiment, said circuit is configured to generate a reproducible number.

BRIEF DESCRIPTION OF THE DRAWINGS

These features and advantages, and others, will be described in detail in the following description of particular embodiments, which description is non-limiting and given with reference to the appended figures, in which:

FIGS. 3A, 3B, 3C, 3D, and 3E illustrate, in the form of timing diagrams, a new interpretation of the operation of a generator of a number of oscillations;

FIG. 4 shows one embodiment of a generator of numbers of oscillations;

DETAILED DESCRIPTION

Elements that are the same have been referenced by the same references in the various figures. In particular, structural and/or functional elements that are common to the various embodiments may have been given the same references and may have identical structural, dimensional and compositional properties. For the sake of clarity, only those elements that are useful to the comprehension of the described embodiments have been shown and will be detailed. In particular, uses of the delay lines and applications of the circuits integrating these delay lines have not been described except in relation to one example applied to a generator of random numbers of oscillations, but the described embodiments are more generally compatible with the conventional uses and applications of delay lines. Arbitrarily, the high state of a logic signal has been designated the 1 state and its low state the 0 state. When reference is made to the terms "about", "approximately" or "of the order of", this means to within 10% and preferably to within 5%.

Figure 1:
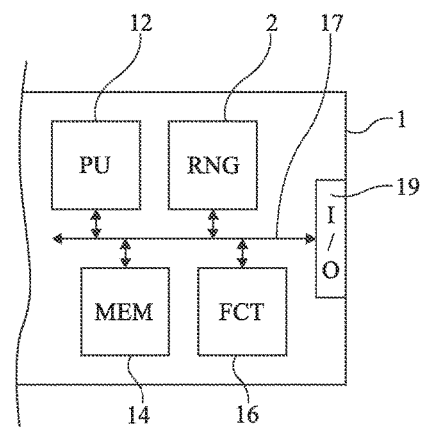
FIG. 1 shows, schematically and in block form, one embodiment of an electronic circuit of the type to which the described embodiments apply.

FIG. 1 shows, very schematically, an electronic circuit 1 of the type to which the embodiments that will be described apply.

The circuit 1 includes, inter alia: a processing or computing entity 12 (PU), for example a state machine, a microprocessor, a programmable logic circuit, etc.; one or more volatile and/or non-volatile storage zones 14 (MEM) for storing all or some of the data and keys; one or more circuits 16 implementing various functions (FCT) related to the application for which the circuit 1 is intended, for example a cryptoprocessor, a circuit for controlling a biometric sensor, etc.; one or more address and/or control data buses 17 running between the various internal elements of the circuit 1, and an input/output interface 19 (I/O) for communication with the exterior of the circuit 1; and one or more circuits 2 (RNG) for generating random numbers including delay lines.

Figure 2:
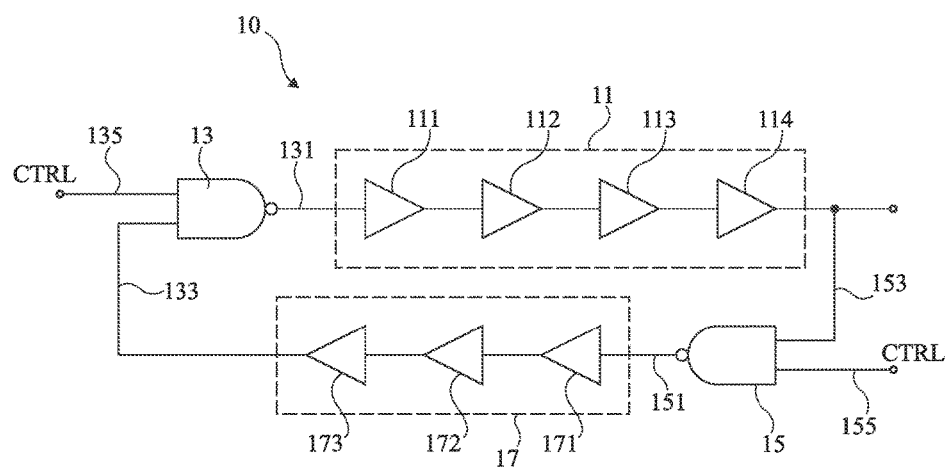
FIG. 2 shows an example of a circuit for generating a number of oscillations for a random-number generator or an unclonable-number generator.

FIG. 2 shows an example of a circuit for generating a number of oscillations for a random-number generator which is based on delay lines.

This generator 10 is based on two delay lines each composed of delaying elements in series and looped back on each other, each delaying element returning the signal in the same state (1 or 0) as its input. The number of delaying elements of each chain may be different or identical. In the shown example, a first line 11 includes four delaying elements 111, 112, 113 and 114 in series between an output terminal 131 of a first NAND logic gate 13 and a first input terminal 153 of a second NAND logic gate 15. A second line 17 includes three delaying elements 171, 172 and 173 in series between an output terminal 151 of the second gate 15 and a first input 133 of the first gate 13. The second respective inputs 135 and 155 of the logic gates 13 and 15 form input terminals intended to receive the same control signal CTRL (triggering the generation of a number). The number of oscillations, which sets the random number, is sampled, for example, at the output of the first line, i.e. on the first input 153 of the gate 15. As a variant, the number of oscillations may be sampled at the input 133 of the gate 13, at the output 131 of the gate 13 or at the output 151 of the gate 15.

The difference between the delays applied by the two lines sets the duty cycle of the signals present on the terminals 133 and 153.

In theory, the generator of FIG. 2 oscillates indefinitely with a duty cycle provided that the signal CTRL is in the 1 state. In practice, in the absence of noise but with delaying elements (logic gates) of different delays, which end up sufficiently deforming the duty cycle so that the oscillator stops, the generator ends up stopping after a set number of oscillations. In the presence of noise (phase jitter), the generator ends up stopping but after a number of oscillations the value of which varies.

Thus, the fact that the generator stops is not a drawback per se, quite on the contrary, but what is a drawback is not being able to determine about which value (which number of oscillations) it will stop. Specifically, for the generator of random numbers to operate correctly, it is necessary for it to have accumulated enough noise, and therefore a sufficient number of oscillations, for the result of the count of the number of oscillations to deliver, when the counter stops, a sufficient randomness in the level of its least significant bit or of a few (less than 10) least significant bits of the oscillation counter.

The embodiments described below have their origins in a new analysis of the behavior of a generator of numbers of oscillations.

FIGS. 3A, 3B, 3C, 3D and 3E illustrate, via timing diagrams, the theoretical operation of the circuit of FIG. 2. FIG. 3A shows one example of the form that the signal CTRL may take. FIG. 3B illustrates an example corresponding to the form of the signal present on the output 131 of the gate 13. FIG. 3C illustrates an example corresponding to the form of the signal present on the output of the first line (the input 133 of the gate 13). FIG. 3D illustrates an example corresponding to the form of the signal present on the output 151 of the gate 15. FIG. 3E illustrates an example corresponding to the form of the signal present on the output of the first line (the input 153 of the gate 15).

It is assumed that the delay applied by each gate and by each delaying element is equal to a value $td_u$ that is identical for all the elements and gates.

When the signal CTRL is in the 0 state, the outputs 131 and 151 are all the time in the 1 state. Therefore the outputs 133 and 153 of the lines 17 and 11 are stable in the 1 state.

At an instant t30, the signal CTRL is switched to the 1 state in order to activate the generation. After a delay $td_u$, the outputs 131 and 151 switch to the 0 state at an instant t31. The lines 13 and 15 respectively, apply delays of $4*td_u$ and of $3*td_u$ to the rising and falling fronts of the signals present on the terminals 131 and 151. Therefore, the signal 133 switches to the 0 state at an instant t32, subsequent by $3*td_u$ to the instant t31 and the signal 153 switches to the 0 state at an instant t33 subsequent by $4*td_u$ to the instant t31.

The signals 131 and 151 then switch to the 1 state with a delay $td_u$ with respect to the instants t32 and t33, respectively, and so on.

The number of oscillations sampled, preferably at output 153 (or 133), when the oscillation stops, is random. It will be noted that this number of oscillations may be counted at any point on the ring.

Apart from phase noise, one of the factors that causes the generator to stop in particular results from a disequilibrium between the rise times and fall times of the signals, i.e. between the time that a delaying element or a gate takes to switch from the 1 state to the 0 state and from the 0 state to the 1 state. Specifically, the offset between the rise times and fall times of a branch of the generator (delay line plus NAND gate) means that there arrives a moment when the duration of a state becomes shorter than the delay applied by an element of the delay line.

One problem is that this "moment" depends on the number of delaying elements of the line (accumulation of temporal offsets). However, it would be desirable to be able to make the length of time before a generator stops controllable in order, during the design of a new circuit, to be able to guarantee that there will be a sufficient number of oscillations before the generator stops.

In addition to reusing the notations of the example of FIG. 2, below:
$t1_n$ will denote the instant of a (rising or falling) front of rank n of the signal on the output 131;
$t2_n$ will denote the instant of a (rising or falling) front of rank n of the signal on the output 151;

$L1_n$ will denote the duration of the low level of rank n of the signal on the output 131 (this duration is related to the delay applied by the second line 17 plus the first gate 13);

$H2_n$ will denote the duration of the high level of rank n of the signal on the output 151 (this duration is related to the delay applied by the first line 11 plus the second gate 15);

$tr_1$ and $tf_1$ will denote the respective rise and fall times of the signal on the output 151 with respect to the instant at which the terminal 131 is switched; and $tr_2$ and $tf_2$ will denote the respective rise and fall times of the signal on the output 131 with respect to the instant at which the terminal 151 is switched.

The behavior of the generator may be described using arithmetic progressions.

In particular, it is possible to write:

$$L1_n = t1_{2n+1} - t1_{2n}; \text{ and}$$

$$H2_n = t2_{2n+2} - t2_{2n+1}.$$

Moreover:

$$t1_{2n} = t2_{2n-1} + tf_2;$$

$$t1_{2n+1} = t2_{2n} + tr_2;$$

$$t2_{2n-1} = t1_{2n-2} + tr_1; \text{ and}$$

$$t2_{2n} = t1_{2n-1} + tf_1.$$

It is possible to deduce therefrom that:

$$L1_n = H2_{n-1} - \Delta fr_2, \text{ where } \Delta fr_2 = tf_2 - tr_2; \text{ and}$$

$$H2_{n-1} = L1_{n-1} + \Delta fr_1, \text{ where } \Delta fr_1' = tf_1 - tr_1.$$

Using these relationships, it is possible to express the recurrences of the various durations simply as a function of the differences between the rise and fall times.

For example, for the duration $L1n$, it is possible to write:

$$L1_{n+1} = L1_n + \Delta fr_1 - \Delta fr_2.$$

Then, expressing the progression starting with the first term $L1_0$ (n=0):

$$L1_n = L1_0 - n*r, \text{ where } r = \Delta fr_2 - \Delta fr_1.$$

Therefore, an arithmetic progression is obtained the difference r between the consecutive terms of which is determinable, during the design of the circuit, given the number of basic cells (delaying elements) chosen and the difference between their rise times and fall times.

A similar relationship may be written for the durations H2, where $$H2_n = H2_0 - n*r.$$

Similarly, denoting:

$H1_n$, the duration of the high level of rank n of the signal on the output 131 (this duration is related to the delay applied by the first line 11 plus the second gate 15);

$L2_n$, the duration of the low level of rank n of the signal on the output 151 (this duration is related to the delay applied by the first line 11 plus the second gate 15); and It is possible to obtain the following relationships:

$$H1_n = H1_0 + n*r; \text{ and}$$

$$L2_n = L2_0 + n*r.$$

If the difference between the rise times and fall times (the difference r between the consecutive terms) is negative, the durations L1 and H2 increase whereas the durations L2 and H1 decrease. In contrast, if the difference r between the consecutive terms is positive, the durations L1 and H2 decrease whereas the durations L1 and H2 increase.

FIG. 4 shows one embodiment of a generator 20 of numbers of oscillations taking advantage of this analysis.

In particular, it is desired to be able to control (in order to obtain characteristics desired for the random generator) the temporal behavior of the oscillation generator, i.e. the time at which it stops. This time not only depends on the delay applied by the delay lines but also on the rise and fall times of these lines.

Since it is known how the basic cells (delaying elements) of the technology in which it is desired to produce the random generator behave, it is possible to deduce the number of oscillations after which the generator will stop. With a positive difference r between the consecutive terms, it is possible to set a limit when the duration $L1_n$ becomes zero, i.e. $n = L1_0/r$. In practice, the oscillations stop when the duration of the pulse becomes shorter than the delay of a delaying element.

According to this embodiment, each branch is composed of a delay line 21 and 27, respectively, which is said to be symmetric, i.e. it has identical or very similar rise and fall times (difference between the rise and fall time smaller than one tenth of the difference r between the consecutive terms), in series with an element 22 and 24, respectively, that is said to be asymmetric, i.e. the rise and fall times of which are different from each other. An input terminal 231 of the first branch is connected to the output of a first NAND logic gate 23 a first input 235 of which receives a triggering signal CTRL and a second input 233 of which receives the output of the second branch. An output terminal 253 of the first branch is connected to a second input of a second NAND gate 25 a first input 255 of which receives the signal CTRL and the output 251 of which is connected to the input of the second branch. The output of the generator of a random number of oscillations is, for example, the terminal 253 or the terminal 233. As above, this output, and therefore the oscillations counted, may as a variant correspond to the output 231 or 251 of the gate 23 or 25, respectively, or more generally to any point on the ring. In practice, the output is connected to the input of an asynchronous counter of the number of oscillations, which counts the number of oscillations between the activation of the generator by the signal CTRL and the stoppage of the oscillations. This counter (not shown in FIG. 4), for example, consists of a flip-flop or a plurality of flip-flops in cascade, the clock input of the flip-flop, or a first flip-flop of the plurality of flip-flops, receiving the output signal of the generator. The one or more outputs of the flip-flops deliver a number on one or more bits (depending on the number of flip-flops) generally only the least significant bit or bits of which are preserved to form the random number.

Where needs be, a plurality of generators are used in parallel in order to increase the number of random bits generated per unit time.

To produce the symmetric delay lines 21 and 27, paired inverters may be used, i.e. an even number of inverters in each line. For example, the line 21 includes p pairs of inverters 3 in series whereas the line 27 includes q pairs of inverters 3 in series. The numbers p and q may be identical or different from each other.

Since pairs of inverters are used, not only is the signal output from each line not inverted but above all each line has an identical or very similar rise and fall time (difference smaller than one tenth of the difference r divided by p or by q). Specifically, if identical logic cells in the technology in question are used, even if one inverter 3 produced in this technology has a rise time different from its fall time, a pair of identical inverters 3 forms an element the rise and fall times of which are identical. Denoting the rise and fall times of an inverter 3 tr and tf, respectively, the rise and fall time of a pair becomes tr+tf (tr+tf or tf+tr depending on the direction of the input front). Thus, even if the times tf and tr are different from each other, their sum remains constant for all the pairs of inverters. The lines 21 and 27 therefore apply a delay that is determinable and constant whatever the transition (rise or fall).

Any type of inverter may be used (for example, CMOS inverters formed from two transistors in series, NOR or NAND gates with interconnected inputs, etc.) provided that these inverters meet the condition of associating, in succession, when they are paired in series, a rise time and a fall time, or vice versa, and therefore ensure these times are summed whatever the front input.

To produce the asymmetric elements 22 and 24, a non inverting logic-amplifier type element (buffer), but not two identical inverters in series, is used.

According to the embodiment that is described below with reference to FIG. 6, a logic function is provided that may be likened to an inverting function depending only on a single input, and the rise and fall times of which are different. Each element 22 and 24 is chosen to have a rise time that is different from its fall time. In addition, the elements 22 and 24 are chosen to have different differences between their rise and fall times. Thus, the differences on which the stoppage of the generator will depend are introduced. In practice, as will be clear from the formulae given above, the gates 23 and 25 also have an effect on the offset between the rise and fall times of each branch. This effect must be added to that of the elements 24 and 22, respectively, to obtain the offsets, $\Delta fr_1$ and $\Delta fr_2$, respectively, and therefore the differences between the consecutive terms of the arithmetic progressions.

One advantage of the proposed embodiment is that the numbers p and q of pairs of inverters of the lines 21 and 27 have no influence on the difference between the consecutive terms of the arithmetic progressions defining the oscillations. Specifically, only the first terms of each progression, i.e. the durations of the first pulses that follow the switching of the signal CTRL to activate the generation, are dependent thereon.

According to one simplified embodiment, provision is made for just one element 22 or 24, the other branch containing only a symmetric delay line.

The lines 21 and 27 may either be placed upstream or downstream of the elements 22 and 24 with which they are respectively associated. As a variant, the elements 22 and 24 are even inserted, in the lines 21 and 27, between the inverters or pairs of inverters from which they are formed.

The number generated is interpreted by counting pulses on one of the outputs 233 and 253 and by taking, by way of random bit, for example, the least significant bit at the end of the counting period. The counting period is set by a clock signal.

Figure 5:
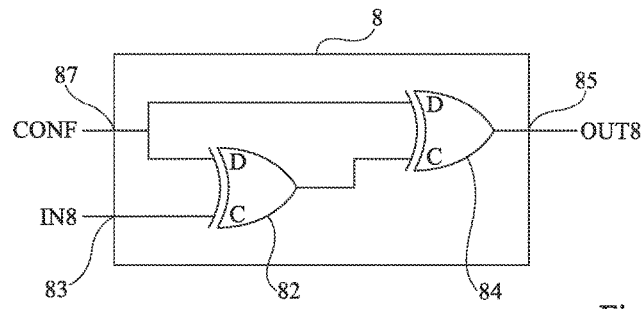
FIG. 5 shows, schematically, one embodiment of a cell of a configurable delay line.

FIG. 5 shows one embodiment of an element (cell) of a delay line, which is configurable to produce a symmetric- or asymmetric-delay delaying element.

The cell 8 includes two XOR logic gates. A first gate 82 has a first input C connected to an input terminal 83 of the cell 8, which receives a signal IN8. The output of the first gate 82 is connected to a first input C of a second XOR logic gate 84 the output of which is connected to an output terminal 85 of the cell 8, which delivers a signal OUT8. The second inputs D of the two gates 82 and 84 are connected to a terminal 87 for applying a signal CONF allowing the configuration of the cell to be toggled between symmetric and asymmetric.

Preferably, the interconnection of the gates 82 and 84 respects the order of their respective inputs. Thus, a given input (for example D) receives the signal CONF and the output of the gate 82 is connected to the input (for example C) of the gate 84, which corresponds to the same type of input of the gate 82 that receives the signal IN8. Thus, it is guaranteed that the propagation time, in the gate 82, of the signal IN8 is the same as the propagation time, in the gate 84, of the signal delivered by the output of the gate 82.

Depending on the state of the signal CONF, the cell 8 acts as a symmetric or an asymmetric delaying element.

If the signal CONF is in the 1 state, then the rise time tr8 (time taken for the output signal OUT8 to pass from 0 to 1 under the effect of a switch from 0 to 1 of the signal IN8) is equal to the sum of the fall time tf82 of the first gate 82 and of the rise time tr84 of the second gate 84. The fall time tf8 (time taken for the output signal OUT8 to pass from 1 to 0 under the effect of a switch from 1 to 0 of the signal IN8) is equal to tr82+tf84, where tr82 represents the rise time of the gate 82 and tf84 the fall time of the gate 84. If the gates 82 and 84 are considered to be identical, tr82=tr84 and tf82=tf84. Therefore, the difference between the rise time tr8 and the fall time tf8 is zero. A symmetric delaying element is indeed obtained.

If the signal CONF is in the 0 state, then the rise time tr8 is equal to the sum of the rise times tr82 and tr84 of the gates 82 and 84. The fall time tf8 is equal to the sum of the fall times tf82 and tf84 of the gates 82 and 84. Therefore, since the rise and fall times of each gate are different from each other, the difference between the rise time tr8 and fall time tf8 is not zero. An asymmetric delaying element is indeed obtained.

One advantage of such an embodiment is that it considerably simplifies manufacture. Specifically, all the delay lines may be formed from the same cells 8, the choice between a symmetric or asymmetric delay line being made via the configuring signal.

Figure 6:
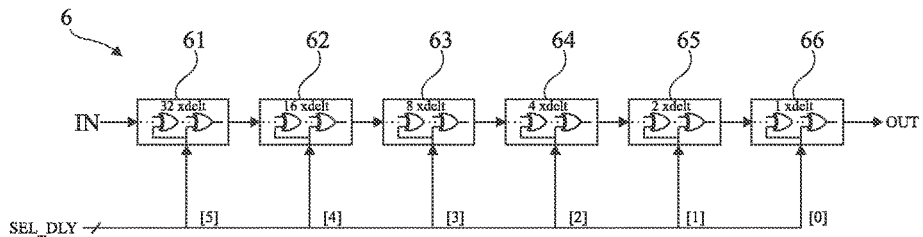
FIG. 6 shows one embodiment of a programmable delay line.

FIG. 6 shows one embodiment of a delay-line branch 6, which may be programmed either to apply a symmetric delay or an asymmetric delay.

The embodiment of FIG. 6 may constitute, by way of particular example in the preceding embodiments, one embodiment of a branch consisting of one or more symmetric delay lines, for example 21, and of one or more asymmetric-delay delaying elements, for example 22.

According to this embodiment, a plurality of delay lines 6i (six delay lines 61, 62, 63, 64, 65 and 66 in the shown example) are associated. Each line 6i consists of one or more cells 8 in series, the inputs 87 of the cells 8 of a given line 6i being interconnected. In other words, a line 6i consists of an even number of XOR logic gates in cascade, all having a common input: the terminal 87. In the shown example, the lines 61, 62, 63, 64, 65 and 66 respectively include 32, 16, 8, 4, 2 and 1 configurable delaying elements (xdelt). The line 61 receives the input signal IN of the delay line 6 and the line 66 delivers the output signal OUT.

Each line 6i is individually configured by a different bit, respectively [5], [4], [3], [2], [1], [0] of a word SEL_DLY. The respective states of the bits of the word SEL_DLY define whether the line 6i in question applies a symmetric or asymmetric delay.

In an application to the production of a generator of numbers of oscillations of the type illustrated in FIG. 4, the input terminal IN of the line 6 is connected to the output (231 or 251, FIGS. 4 and 5) of the branch in question.

Figure 7:
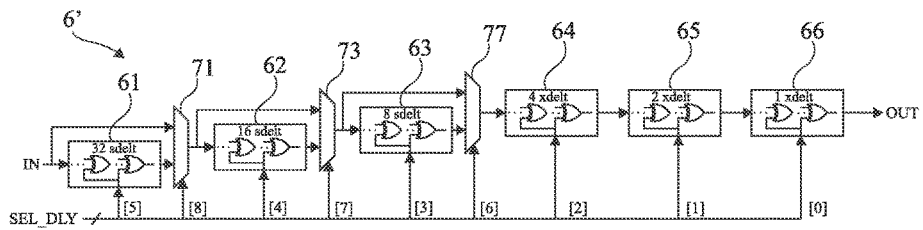
FIG. 7 shows one variant embodiment of FIG. 6.

FIG. 7 shows a variant embodiment of FIG. 6 in which one or more lines 6i or indeed all the lines 6i of the line 6' (in the shown example, the lines 61, 62 and 63) are capable of being short-circuited using a multiplexer 7i (71, 73, 77). In other words, the inputs of the lines 61, 62 and 63 are directly connected to a first input of the multiplexers 71, 73 and 77 the other input of which is connected to the output of the corresponding delay line, respectively. The outputs of the multiplexers 71, 73, 77 are connected to the inputs of the lines 62, 63 and 64, respectively.

Each multiplexer 71, 73, 77 is individually controllable, for example, by a different bit. In the example of FIG. 7, the word SEL_DLY includes three additional bits [6], [7] and [8] for controlling the multiplexers 77, 73, 71, respectively.

Figure 8:
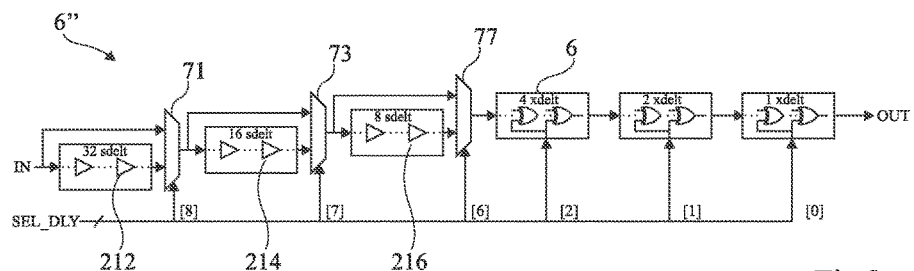
FIG. 8 shows another variant embodiment of FIG. 6.

FIG. 8 shows another variant embodiment in which the line 6" includes configurable lines 6i and symmetric delay lines. In the shown example, there are three lines 212, 214, 216, which preferably consist of one or more pairs of inverters, i.e. of delaying elements each having identical rise and fall times such as described above. The lines 212, 214, 216 replace the lines 61, 62 and 63 of FIG. 7 and respectively include 32, 16 and 8 pairs of inverters, i.e. 32, 16 and 8 unitary symmetric delaying elements (sdelt). As the lines 212, 214 and 216 are not configurable, the signal SEL_DLY includes only six bits, arbitrarily denoted [8], [7], [6], [2], [1], [0] in order to respect the notation of FIG. 7.

Thus, both the delay and the difference between the rise time and fall time of the delay line 6 are programmable.

The number of symmetric and asymmetric delay lines depends on the desired capacity to make adjustments. The asymmetric elements not only have different rise and fall times but also an intrinsic delay that contributes to the total delay of the delay line.

The embodiments of FIGS. 6 to 8 may, for example, be integrated into a given generator architecture and allow this architecture to be programmed, whether this be during its design or in the application.

The embodiments of FIGS. 6 to 8 may be combined with that of FIG. 4.

Figure 9:
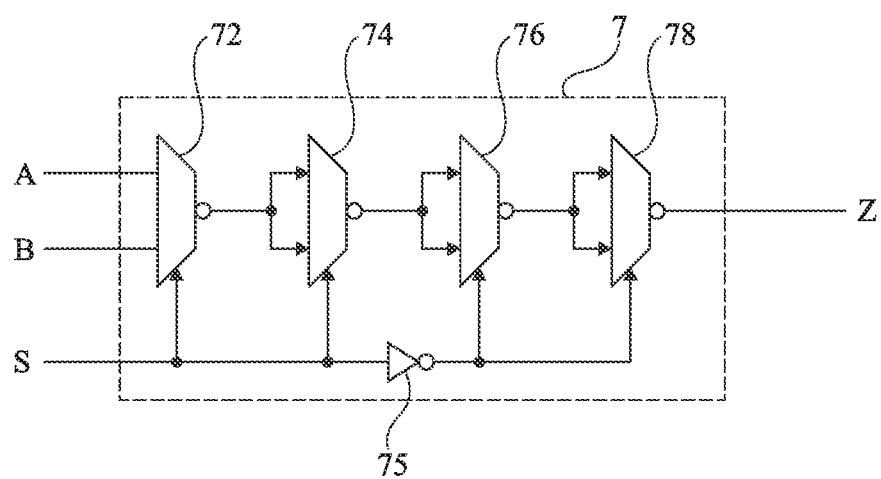
FIG. 9 shows one embodiment of a multiplexer 7 having a symmetric operation.

FIG. 9 shows one embodiment of a multiplexer 7 with a symmetric operation, i.e. an identical rise time and fall time.

The multiplexer 7 of FIG. 9 is a two-to-one multiplexer, i.e. it selects one of its two inputs A or B and delivers the corresponding signal as output Z. A control signal S selects between the inputs A and B.

The multiplexer 7 includes four two-to-one selecting or multiplexing elements. The multiplexer 7 may be considered to consist of 4 unitary multiplexers 72, 74, 76 and 78 associated in a chain. The multiplexers are inverting multiplexers. A first multiplexer 72 has its input terminals connected to the inputs A and B, respectively. A second multiplexer 74 has its two inputs connected together to the output of the first multiplexer 72. A third multiplexer 76 has its two inputs connected together to the output of the second multiplexer 74. A fourth multiplexer 78 has its two inputs connected together to the output of the third multiplexer 76 and its output delivers the output Z. The signal S directly controls the multiplexers 72 and 74 and, after having passed through an inverter 75, the multiplexers 76 and 78.

The fact that the multiplexers 74, 76 and 78 have their inputs interconnected means that they in fact make no selection. However, assuming that all the multiplexers 72, 74, 76 and 78 are identical, they all have identical rise and fall times. In addition, they all have a similar behavior when a front is applied to their first input and all a similar behavior when a front is applied to their second input.

If the rise times are denoted tr and the fall times denoted tf, and if these notations are assigned a first index A or B depending on whether the front is applied to the input A (the first input of the unitary multiplexer in question) or to the input B (the second input of the unitary multiplexer in question), respectively, and a second index 72, 74, 76 or 78 indicating the unitary multiplexer in question, it is possible to write:

$$tr_{A72}=tr_{A74}=tr_{A76}=tr_{A78}=tr_A;$$

$$tf_{A72}=tf_{A74}=tf_{A76}=tf_{A78}=tf_A;$$

$$tr_{B72}=tr_{B74}=tr_{B76}=tr_{B78}=tr_B;\text{ and}$$

$$tf_{B72}=tf_{B74}=tf_{B76}=tf_{B78}=tf_B.$$

Because the signal controlling the two multiplexers 76 and 78 is inverted with respect to that controlling the multiplexers 72 and 74, the rise and fall times of the multiplexer 7, from the input A or B to the output Z, may be written, depending on whether a rising front r or falling front f is present on the input A or on the input B:

$$tr_{AZ}=tf_{A72}+tr_{A74}+tf_{B76}tr_{B78};$$

$$tf_{AZ}=tr_{A72}+tf_{A74}tr_{B76}+tf_{B78};$$

$$tr_{BZ}=tf_{B72}+tr_{B74}+tf_{A76}tr_{A78};\text{ and}$$

$$tf_{BZ}=tr_{B72}+tf_{B74}tr_{A76}+tf_{A78}.$$

As the unitary rise and fall times are identical for a given input, it may be deduced that:

$$tr_{AZ}=tf_{AZ}=tr_{BZ}=tf_{BZ}=tr_A+tf_A+tr_B+tf_B.$$

Therefore, the rise and fall times of the multiplexer 7 are identical whatever the input in question. The multiplexer is therefore symmetric with the definition given above.

As a variant, provision may be made to invert the control signal at other locations provided that two multiplexers select their respective first inputs when the two others select their respective second inputs. In this case, care will however need to be taken to ensure that the propagation delay applied by the inverters is no greater than the minimum propagation time of a unitary multiplexer, as otherwise the output will be corrupted. One advantage of the embodiment of FIG. 9 is that it guarantees that the selection of the multiplexers 76 and 78 is active before the signal (the front) has finished passing through the multiplexers 72 and 74.

Although no more advantageous in terms of symmetry, provision may be made to use 8, 12, 16 and more generally any multiple of four unitary multiplexers provided that the signal used to control half of them is the inverse of that used to control the other half. This for example allows propagation time to be increased without adversely affecting the symmetry of operation.

One advantage of the embodiment of FIG. 9 is that it is independent of the internal structure of the unitary multiplexers. Specifically, provided that identical unitary multiplexers are used, the described operation is respected.

A multiplexer such as shown in FIG. 9 has multiple applications. In particular, it is frequently advantageous to have a symmetric operation.

By way of a particular example of an application, the multiplexer of FIG. 9 may be used to produce each of the multiplexers 71, 73 and 77 of the embodiments of FIGS. 7 and 8. One advantage is then that the difference between the consecutive terms of the progression governing the sequences of pulses of the number generator remains uniquely related to the elements 8, this making device parameter selection easier.

One advantage of the embodiments that have been described is that they allow a random-number generator to be reliably and determinably designed or configured. Thus, it is possible to meet criteria set in a specification and to confirm that the generator meets this specification.

Another advantage is that the described solution is compatible with the use of standard cells in a given technology.

Another advantage is that the generator is producible with logic elements.

For a random-number generator, the number is sampled either after a fixed time interval, triggered by the activation of the generator (signal CTRL) and chosen to be longer than the maximum time taken for the generator to stop, or after the one or more counters have been detected to stop.

To produce a generator of unclonable numbers of integrated-circuit-identifier type, the delay lines and the difference between the consecutive terms of the arithmetic progressions are selected in order to set the number of oscillations. The number is sampled after the generator has stopped, as in a random-number generator, and preferably only some of the bits are preserved (the most significant).

Various embodiments have been described. Various variants and modifications will appear obvious to those skilled in the art. In particular, the choice of the delays applied by the symmetric delay lines and the offsets applied by the asymmetric delaying elements depends on the application and on the specification of the generator. Lastly, practical implementation of the embodiments that have been described is within the ability of those skilled in the art, on the basis of the functional indications given above.

The invention claimed is:

1. A delaying element, including:
    a first XOR logic gate having a first input defining a first input terminal of the delaying element that receives an oscillating signal; and
    a second XOR logic gate having a first input connected to an output of the first XOR logic gate and an output defining an output terminal of the delaying element,
    wherein a second input of the first XOR logic gate is connected to a second input of the second XOR logic gate, the connected second inputs defining a second input terminal of the delaying element that receives a control signal, wherein logic states of the control signal are independent of change in logic states of the oscillating signal.

2. The delaying element according to claim 1, wherein a first state of a configuration signal applied to the second input terminal of the delaying element controls the delaying element to apply symmetric delays to rising fronts and to falling fronts of an input signal received at the first input terminal of the delaying element, and wherein a second state of the configuration signal applied to the second input terminal of the delaying element controls the delaying element to apply different delays to rising fronts and to falling fronts of the input signal received at the first input terminal of the delaying element.

3. A delay line including a plurality of delaying elements connected in series, wherein each delaying element comprises:
    a first XOR logic gate having a first input defining a first input terminal of the delaying element; and
    a second XOR logic gate having a first input connected to an output of the first XOR logic gate and an output defining an output terminal of the delaying element,
    wherein a second input of the first XOR logic gate is connected to a second input of the second XOR logic gate, the connected second inputs defining a second input terminal of the delaying element;
    wherein the output terminal of one delaying element is connected to the first input terminal of a next delaying element in the series connected plurality of delaying elements; and
    a multi-bit select delay control signal, wherein the second inputs of the delaying elements are connected to receive different bits of the multi-bit select delay control signal.

4. The delay line according to claim 3, wherein a first state of a configuration signal applied to the second input terminal of each delaying element controls the delaying element to apply symmetric delays to rising fronts and to falling fronts of an input signal received at the first input terminal of the delaying element, and wherein a second state of the configuration signal applied to the second input terminal of each delaying element controls the delaying element to apply different delays to rising fronts and to falling fronts of the input signal received at the first input terminal of the delaying element.

5. The delay line according to claim 3, further including at least one multiplexer inserted between two series connected delaying elements, said at least one multiplexer having a first input connected to an output of a first one of said two series connected delaying elements, a second input connected to an input of said first one of said two series connected delaying elements and having a control input to control selection between the first and second inputs in response to a bit of said multi-bit select delay control signal.

6. A plurality of delay lines connected in series, wherein at least one delay line of the plurality of delay lines comprises a plurality of delaying elements connected in series, wherein each delaying element comprises:
    a first XOR logic gate having a first input defining a first input terminal of the delaying element; and
    a second XOR logic gate having a first input connected to an output of the first XOR logic gate and an output defining an output terminal of the delaying element,
    wherein a second input of the first XOR logic gate is connected to a second input of the second XOR logic gate, the connected second inputs defining a second input terminal of the delaying element;
    wherein the output terminal of one delaying element is connected to the first input terminal of a next delaying element in the series connected plurality of delaying elements; and
    a multi-bit select delay control signal, wherein the second inputs of the delaying elements are connected to receive different bits of the multi-bit select delay control signal.

7. The plurality of delay lines according to claim 6, wherein a first state of a configuration signal applied to the second input terminal of each delaying element controls the delaying element to apply symmetric delays to rising fronts and to falling fronts of an input signal received at the first input terminal of the delaying element, and wherein a second state of the configuration signal applied to the second input terminal of each delaying element controls the delaying element to apply different delays to rising fronts and to falling fronts of the input signal received at the first input terminal of the delaying element.

8. The plurality of delay lines according to claim 6, further including at least one multiplexer inserted between two series connected delay lines, said at least one multiplexer having a first input connected to an output of a first one of said two series connected delay lines, a second input connected to an input of said first one of said two series connected delay lines and having a control input to control selection between the first and second inputs in response to a bit of said multi-bit select delay control signal.

9. The plurality of delay lines according to claim 6, further including at least one multiplexer inserted between two series connected delaying elements, said at least one multiplexer having a first input connected to an output of a first one of said two series connected delaying elements, a second input connected to an input of said first one of said two series connected delaying elements and having a control input to control selection between the first and second inputs in response to a bit of said multi-bit select delay control signal.

10. A plurality of delay lines connected in series to receive an oscillating signal, wherein each delay line of the plurality of delay lines comprises a plurality of delaying elements connected in series, wherein each delaying element comprises:
    a first XOR logic gate having a first input defining a first input terminal of the delaying element; and
    a second XOR logic gate having a first input connected to an output of the first XOR logic gate and an output defining an output terminal of the delaying element,
    wherein a second input of the first XOR logic gate is connected to a second input of the second XOR logic gate, the connected second inputs defining a second input terminal of the delaying element that receives a control signal, wherein logic states of the control signal are independent of change in logic states of the oscillating signal.

11. The plurality of delay lines according to claim 10, wherein a first state of a configuration signal applied to the second input terminal of each delaying element controls the delaying element to apply symmetric delays to rising fronts and to falling fronts of an input signal received at the first input terminal of the delaying element, and wherein a second state of the configuration signal applied to the second input terminal of each delaying element controls the delaying element to apply different delays to rising fronts and to falling fronts of the input signal received at the first input terminal of the delaying element.

12. The plurality of delay lines according to claim 11, wherein a first one of said plurality of delay lines connected in series receives the configuration signal in the first state to control application of symmetric delays to rising fronts and to falling fronts and wherein a second one of said plurality of delay lines connected in series receives the configuration signal in the second state to control application of different delays to rising fronts and to falling fronts.

13. The plurality of delay lines according to claim 10, further including at least one multiplexer inserted between two series connected delaying elements, said at least one multiplexer having a first input connected to an output of a first one of said two series connected delaying elements and having a second input connected to an input of said first one of said two series connected delaying elements.

14. The plurality of delay lines according to claim 10, further including at least one multiplexer inserted between two series connected delay lines, said at least one multiplexer having a first input connected to an output of a first one of said two series connected delay lines and having a second input connected to an input of said first one of said two series connected delay lines.

15. A circuit, comprising:
    a first branch including a first delay line, wherein the first delay line is configured to apply symmetric delays to rising fronts and to falling fronts of a signal passing through the first branch;
    a second branch including a second delay line, wherein the second delay line is configured to apply different delays to rising fronts and to falling fronts of a signal passing through the second branch;
    wherein an output of the first branch is coupled to an input of the second branch; and
    wherein an output of the second branch is coupled to an input of the first branch.

16. The circuit according to claim 15, wherein the first branch further includes a delay circuit configurable to apply different delays to rising fronts and to falling fronts of the signal passing through the first branch.

17. The circuit according to claim 15, wherein at least the second delay line comprises a plurality of delaying elements connected in series, wherein each delaying element comprises:
    a first XOR logic gate having a first input defining a first input terminal of the delaying element; and
    a second XOR logic gate having a first input connected to an output of the first XOR logic gate and an output defining an output terminal of the delaying element,
    wherein a second input of the first XOR logic gate is connected to a second input of the second XOR logic gate, the connected second inputs defining a second input terminal of the delaying element.

18. The circuit according to claim 17, wherein a first state of a configuration signal applied to the second input terminal of each delaying element controls the delaying element to apply symmetric delays to rising fronts and to falling fronts of an input signal received at the first input terminal of the delaying element, and wherein a second state of the configuration signal applied to the second input terminal of each delaying element controls the delaying element to apply different delays to rising fronts and to falling fronts of the input signal received at the first input terminal of the delaying element.

19. The circuit according to claim 17, further including at least one multiplexer inserted between two series connected delaying elements, said at least one multiplexer having a first input connected to an output of a first one of said two series connected delaying elements and having a second input connected to an input of said first one of said two series connected delaying elements.

20. The circuit according to claim 15, further comprising at least one counter configured to count a number of oscillations which occur in an oscillating signal output from one of the first and second branches up to a point where oscillation of the oscillating signal fails.

21. The circuit according to claim 20, wherein the number of oscillations is a random number.

* * * * *

UNITED STATES PATENT AND TRADEMARK OFFICE
CERTIFICATE OF CORRECTION

PATENT NO. : 10,187,040 B2
APPLICATION NO. : 15/700475
DATED : January 22, 2019
INVENTOR(S) : Albert Martinez Page 1 of 1

It is certified that error appears in the above-identified patent and that said Letters Patent is hereby corrected as shown below:

In the Specification

At Column 5, Line 34, replace the equation [[ $H2_{n-1} = L1_{n-1} + \Delta fr_1$, where $\Delta fr_1' = tf_1 - tr_1$. ]] with -- $H2_{n-1} = L1_{n-1} + \Delta fr_1$, where $\Delta fr_1 = tf_1 - tr_1$. --.

At Column 8, Line 1, replace the term [[ OUTS ]] with -- OUT8 --.

At Column 10, Lines 26 - 32, replace the equations:
[[ $tr_{AZ} = tf_{A72} + tr_{A74} + tf_{B76}tr_{B78}$;
$tf_{AZ} = tr_{A72} + tf_{A74}tr_{B76} + tf_{B78}$;
$tr_{BZ} = tf_{B72} + tr_{B74} + tf_{A76}tr_{A78}$; and
$tf_{BZ} = tr_{B72} + tf_{B74}tr_{A76} + tf_{A78}$. ]]
With:
-- $tr_{AZ} = tf_{A72} + tr_{A74} + tf_{B76} + tr_{B78}$;
$tf_{AZ} = tr_{A72} + tf_{A74} + tr_{B76} + tf_{B78}$;
$tr_{BZ} = tf_{B72} + tr_{B74} + tf_{A76} + tr_{A78}$; and
$tf_{BZ} = tr_{B72} + tf_{B74} + tr_{A76} + tf_{A78}$. --.

Signed and Sealed this
Eighteenth Day of June, 2019

Andrei Iancu
*Director of the United States Patent and Trademark Office*